Patented July 23, 1940

2,208,825

UNITED STATES PATENT OFFICE 2,208,825

OIL PRESS FILTER CLOTH AND METHOD

Clarence B. White, Montclair, N. J.

No Drawing. Application June 8, 1937,
Serial No. 147,039

2 Claims. (Cl. 210—204)

This invention relates, generally, to the filtering of hydrocarbon oils and the invention has reference, more particularly, to a novel filter cloth and method adapted for use in oil presses in the filtering of oils and waxes of the petroleum series. This application is a division of my copending application Serial No. 71,249, filed March 27, 1936, for Oil press filter cloth and method.

Many difficulties have heretofore been experienced in filtering petroleum oils and waxes, owing largely to the dense, viscous and colloidal nature of these substances which causes them to offer great resistance to passage through filtering mediums, and, in fact, heavy mechanical pressure in addition to especially constructed filter ducks or cloths must be used for satisfactory results. Only multiplied fabrics with many threads in both twisted warp and filling threads, such as 12/0 oil press duck, are suitable for filtering these substances, but such fabric invariably has a more or less rough surface covered with a mass of fine hairs or fibriles constituting a nap which is highly objectionable in filtering these substances because the filter cake tends to cling to the rough surface of the filter cloth, thereby not only plugging the fabric and consequently impeding filtration, but also making it difficult to remove the filter cake without abrading or injuring the fabric and shortening the life thereof. Furthermore, the viscous, colloidal and gelatinous constituents of the hydrocarbon compounds being filtered strongly adhere to the nap or fibriles of the filter cloth, thereby forming an impermeable film which effectively impedes the passage of the filtrate.

In order to overcome these difficulties, two remedies have heretofore been proposed, one of which is to initially coat the fabric with an oil insoluble film or coating which will either lay the nap or else dissolve and remove it, and the second remedy proposed is to introduce into the material being filtered a very finely divided inorganic matter, such as infusorial earth, kieselguhr, filter-cel, silica, etc., which by attracting the glutinous, viscous, or colloidal components of the oily material, prevent or rather diminish the tendency to plug the interstices by the deposition of an impermeable film on the fabric. The first proposed remedy has not been wholly satisfactory largely because the films used, i. e., pyroxlin or synthetic resin films, are substantially completely impermeable to the passage of oils, while films of the viscous or regenerated cellulose type, while permitting the passage of oil filtrates, are nevertheless soft and loosely coherent so that they soon wear off in use. The most satisfactory coating thus far developed is that furnished by the so-called cuprammonium process, in which the coating consists primarily of a depolymerized, degraded type of cellulose, i. e., a hydrated cellulose together with cupric hydroxide. The coating produced by this process, however, is but slightly permeable to the passage of oils, thereby greatly slowing up the filtering operation and the said coating, while tough and resistant to abrasion, is stiff and inflexible so that the same readily cracks in use and flakes off, thereby greatly shortening the life of the filter cloth, this stiff nature of the coating being due to the presence of dry cupric hydroxide in the coating. The second proposed remedy has not been satisfactory because the interstices of the fabric soon become plugged with a mat of finely divided inorganic particles, cemented glutinous and colloidal hydrocarbon compounds.

The principal object of the present invention is to provide a novel filter cloth and method of dewaxing lubricating oils, said filter cloth having an improved coating thereon that serves to completely remove the nap from the surface of the fabric, the said coating being tough, elastic and flexible, and hence well able to withstand abrasive action such as that obtaining while removing the filter cake, the said filter cloth being readily permeable to oils so as to permit their passage therethrough without the use of excessive pressure and having a long life in use, the flexible nature of the coating allowing the cloth to be bent without any danger of the coating cracking or flaking off, the oils being passed through the filter cloth at a suitable wax separation temperature.

Another object of the present invention lies in the provision of a novel filter cloth and method of dewaxing lubricating oils of the above character, the coating of which filter cloth is entirely insoluble in the lubricating oils and the hydrocarbon compounds filtered thereby, and is continuous so as to prevent the penetration thereof by finely divided inorganic matter such as filtration accelerators, the said coating being also resistant to the action of dilute acids.

Still another object of the present invention is to provide a novel filter cloth and method of dewaxing lubricating oils, utilizing a filter cloth having a coating consisting of regenerated cellulose having the reaction product, produced by the reaction of one or more metallic compounds upon cupric hydroxide, distributed throughout the body of the coating in the form of discrete particles of crystalline nature.

Other objects and advantages of this invention will become apparent as the description proceeds.

The cupric hydroxide in the ordinary cuprammonium coating previously mentioned is in the form of an amorphous colloidal substance that is more or less distributed in agglutinated shapeless masses throughout the coating, thereby rendering the coating brittle and subject to flaking off in use, the masses of amorphous copper hydroxide acting to greatly impede the flow of oils therethrough, thereby slowing up the filtering operation. Furthermore, when oils containing traces of acid or sulphur are filtered through ordinary cuprammonium coated fabric, the cupric hydroxide of the coating rapidly dissolves away, leaving the regenerated cellulose coating soft, cellular and in a flaccid condition entirely unsuited for its intended purpose, while at the same time the dark copper compounds or salts formed pass into the filtrate, discoloring and contaminating the same.

In carrying out the present invention, I convert this amphorous cupric hydroxide into compounds that are not amorphous but crystalline and which serve to strengthen the coating and prevent its cracking or flaking off in use, the scattered crystalline particles acting as coating reenforcing members while not interfering with the normal filtering function of the filter cloth.

In fabricating the novel filter cloth used in the method of this invention, I first prepare an ammonical solution of cupric oxide. This is prepared by packing copper turnings in a cylinder provided with a cooling jacket for circulating cold brine so as to maintain the temperature of the reaction below 41° F. Ammonium hydroxide (¾ strength) is added to the copper and air is forced through the liquid-copper mixture, forming ultimately, i. e. in from 12 to 30 hours, a cuprammonium solution which for use is preferably diluted with water until the same contains approximately 2% of copper content and 20% of ammonia content.

The duck or fabric to be used in making the filter cloth is now passed through this cold cuprammonium solution, as by running the same under rolls immersed in the solution, to obtain a desired preliminary solvent action on the fabric and the removal of the nap or fibriles covering the same, the period of contact between the fabric and solution varying with the condition of the fabric and ranging from one-half to two minutes. I may even pass the fabric through the solution two or three times according to the result desired. After leaving the solution, the fabric is passed through squeeze rolls to remove excess solution and is then dried as by passing the same through a hot air flue.

As thus prepared, the fabric is coated with a smooth, lustrous film, the nap of the fabric having been completely dissolved and removed. This film or coating consists of regenerated cellulose derived from the solution of a portion of the surface of the fabric in the ammonical solution of cupric oxide, and regenerated by the removal of the contained ammonia, the said film containing cupric hydroxide which is diffused throughout the film essentially in the form of a solid solution with the depolymerized cellulose.

I now proceed to remove the objectionable cupric hydroxide from the film by a suitable step. I dissolve preferably 5 lbs. of a suitable compound in 100 lbs. of the cuprammonium solution, or other suitable solvent, although the amount of the compound used may be varied within wide limits, and then pass the coated fabric through this bath, after which the same is squeezed and dried as before. The fabric may be passed several times through the new solution, if desired, to obtain as thorough a penetration and conversion of the cupric hydroxide as thought expedient for the particular use to which the filter cloth is to be put.

I have listed below several examples of steps by which I may convert the cupric hydroxide from an amorphous material to compounds of crystalline nature distributed as discrete particles throughout the film or coating of the fabric, thereby greatly strengthening the film and improving its filtering qualities. The chemical reactions which are believed to take place between the compound used and the cupric hydroxide of the film are also given.

*Example #1.*—In this example I use an alkaline chromate or an alkaline dichromate dissolved in the cuprammonium solution. Preferably I use ammonium chromate or dichromate, although I may use sodium or potassium chromates or dichromates. When using ammonium chromate the solution, on penetrating the film, causes the following reaction:

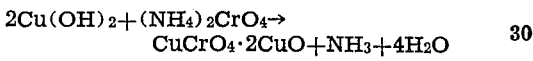

$$2Cu(OH)_2 + (NH_4)_2CrO_4 \rightarrow CuCrO_4 \cdot 2CuO + NH_3 + 4H_2O$$

Thus, it will be noted that the amorphous cupric hydroxide is converted by ammonium chromate into the crystalline basic copper chromate, thereby strengthening and improving the film. When using ammonium dichromate some cupric hydroxide is regenerated, as follows:

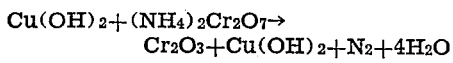

$$Cu(OH)_2 + (NH_4)_2Cr_2O_7 \rightarrow Cr_2O_3 + Cu(OH)_2 + N_2 + 4H_2O$$

*Example #2.*—In this case the initially coated fabric is passed through a hot bath of alkaline sulphide, for example, a 5% bath of sodium sulphide, the bath serving to decompose the copper hydroxide, forming black cupric sulphide in accordance with the following equation:

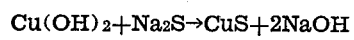

$$Cu(OH)_2 + Na_2S \rightarrow CuS + 2NaOH$$

The new coating thus formed consists of regenerated cellulose and cupric sulphide and is strongly resistant to all acids except the oxygen acids, and is tough and flexible.

*Example #3.*—In this case the initially coated fabric is passed through a hot, acidulated solution of an alkaline ferrocyanide or an alkaline ferricyanide, washed thoroughly and dried. The reaction on the contained cupric hydroxide of the film is as follows:

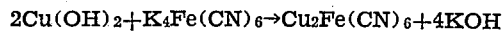

$$2Cu(OH)_2 + K_4Fe(CN)_6 \rightarrow Cu_2Fe(CN)_6 + 4KOH$$

or

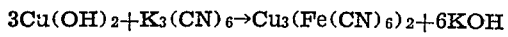

$$3Cu(OH)_2 + K_3(CN)_6 \rightarrow Cu_3(Fe(CN)_6)_2 + 6KOH$$

The addition of acid such as HCl is necessary to neutralize the KOH formed. The coating thus produced is resistant to acids, but not to alkaline solutions. It is tough, flexible, readily permeable and does not flake off.

*Example #4.*—In this case the initially coated fabric is passed through a hot solution of an alkaline oxalate, thusly forming insoluble copper oxalate as follows:

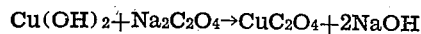

$$Cu(OH)_2 + Na_2C_2O_4 \rightarrow CuC_2O_4 + 2NaOH$$

Other examples might be furnished such as the formation of cupric vanadate, tungstate, manganate from the contained cupric hydroxide. All of the above derived copper compounds are crystalline in nature and hence tend to strengthen the film. Cupric ferrocyanide crystallizes with seven molecules of water, i. e. $Cu_2Fe(CN)_6 \cdot 7H_2O$; cupric basic chromate with two molecules of water $CuCrO_4 \cdot 2CuO \cdot 2H_2O$, and cupric oxalate with ½ molecule of water $CuC_2O_4 \cdot ½H_2O$.

The novel coated filter cloth thus produced is extremely serviceable in use, the same having a lustrous, smooth and continuous coated surface that prevents the pores of the fabric from becoming clogged with filtration assists or with the slimy film producing hydrocarbons associated with petroleum oils. Furthermore, the smooth surface of the coating prevents adhesion between the filter cake and the press cloth so that the press cake falls off without the necessity of scraping, thereby effecting a saving of labor and increasing the productivity of the press by reducing the time it is withdrawn from service for the purpose of evacuating.

The life of the novel filter cloth is much greater than that of those heretofore used and clear filtrates are obtained without the use of mechanical aids such as finely divided inorganic materials. Further, the novel filter cloth of this invention, by enabling filtration to take place without the use of excessive pressure, produces a better grade of oil and the absence of such excessive pressure also prolongs the life of the filter cloth. The highly permeable coating of the filter cloth of this invention makes is possible to use cheap grades of oil in the production of standard grades of manufactured products.

The novel oil press filter cloth of this invention is especially suitable for use in removing wax from hydrocarbon, i. e. petroleum oil, to be used as a lubricant in motor cars. In carrying out this filtering operation, the oil to be filtered is preferably held at a suitable wax separation temperature during its passage under pressure through the filter cloth, suitably carried by filter plates of an oil press. Thus, in filtering low temperature lubricating oils, the oil is held at a wax separation temperature of zero degrees or lower, whereas in filtering high temperature oils, the oil is held at a wax separation temperature ranging up to 130° F.

The novel coating of this invention is especially needed for the herein ducks such as the army, sail and numbered ducks and particularly the naught ducks, such as are used in hydrocarbon oil filtration. For this purpose the variety known as 12/0 duck weighing 32 oz. per lineal yard of 22" width, and frequently containing as high as thirteen warp and filling threads, proves eminently satisfactory.

What is claimed is:

1. The method of removing wax from oil which consists in passing the oil through an oil press filter cloth having a surface coating comprising regenerated cellulose with a crystalline salt of copper of the group consisting of copper oxalate, copper vanadate, copper tungstate, and copper manganate distributed throughout the same.

2. The method of removing wax from lubricating oil derived from petroleum, which consists in passing the lubricating oil at a suitable wax separation temperature under pressure through an oil press filter cloth having a surface coating comprising cellulose with a salt of copper therein of the group consisting of copper oxalate, copper vanadate, copper tungstate, and copper manganate, said salt being distributed throughout the cellulose as discrete crystalline particles.

CLARENCE B. WHITE.